United States Patent [19]

Rugg

[11] Patent Number: 5,865,642
[45] Date of Patent: Feb. 2, 1999

[54] IN-LINE ELECTRICAL CONNECTOR

[75] Inventor: William Rugg, Berthoud, Colo.

[73] Assignee: Maxtor Corporation, Longmont, Colo.

[21] Appl. No.: 618,248

[22] Filed: Mar. 18, 1996

[51] Int. Cl.⁶ ................................................. H01R 9/09
[52] U.S. Cl. ............................................ 439/499; 439/67
[58] Field of Search ................................. 439/67, 77, 74, 439/75, 494, 499

[56] References Cited

U.S. PATENT DOCUMENTS

| | | | |
|---|---|---|---|
| 3,214,713 | 10/1965 | Strobel | 439/470 |
| 3,701,964 | 10/1972 | Cronin | 439/77 |
| 3,961,228 | 6/1976 | Briggs et al. | 439/67 |
| 4,377,316 | 3/1983 | Ecker et al. | 439/67 |
| 4,526,432 | 7/1985 | Cronin et al. | 439/499 |
| 4,749,356 | 6/1988 | Asai et al. | 439/499 |
| 5,158,479 | 10/1992 | Mouissie | 439/589 |

*Primary Examiner*—Neil Abrams
*Assistant Examiner*—T. C. Patel
*Attorney, Agent, or Firm*—Sheridan Ross P.C.

[57] ABSTRACT

An in-line connector adapted for use in a disk drive apparatus and a method for attaching the connector to a flexible circuit. The connector advantageously includes pins having shoulder portions which are adapted to receive and support the flexible circuit. The method includes the step of squeegee soldering the flexible circuit to electrically adhere the flexible circuit to the in-line connector apparatus.

12 Claims, 2 Drawing Sheets

IN-LINE ELECTRICAL CONNECTOR

FIELD OF THE INVENTION

The present invention relates to an electrical in-line connector, such as an in-line connector that is adapted for use in a disk drive apparatus. The present invention also relates to a method for attaching a planar circuit board, such as a flexible circuit board, to an in-line connector.

BACKGROUND OF THE INVENTION

In order to electrically interface two circuit boards or similar device substrates, an electrical connector is commonly used. Such a connector typically includes an insulative body and electrically conductive routing extending through the body from one surface to the opposite surface of the connector. The terminal pads, leads or similar conductive attachments of a first circuit board are attached to one surface of the connector and the conductive attachments of a second circuit board are attached to the opposite surface of the connector. The connector can be useful, for example, when closely spaced leads on one circuit must be interfaced with lower density leads on another circuit or device.

For some applications, such as in a disk drive apparatus, it is often desirable to interface a flexible circuit board to a more rigid printed circuit board. In this situation, the flexible circuit board is typically mounted onto the connector such that the ends of contact pins extends from the connector project through apertures in the flexible circuit. The electrical connections are then made by soldering whereby each contact pin is individually soldered to a corresponding contact pad on the flexible circuit. In-line connectors can include any number of contact pins, such as 24 or more contact pins. The soldering step to connect the flexible circuit board to the connector is therefore a labor-intensive process which significantly adds to the cost of the assembly.

It would be advantageous to provide an in-line connector wherein the electrical connection between a circuit, such as a flexible circuit, and a connector can be easily fabricated in high volumes while reducing the labor required to produce the assembly.

SUMMARY OF THE INVENTION

According to one embodiment of the present invention, an in-line connector adapted for use in a disk drive apparatus is provided. The in-line connector includes an insulative connector body having a first surface and a second surface and a plurality of electrical contacts on the first surface. A plurality of contact pins extending from the second surface are electrically interconnected with the electrical contacts through the connector body, the pins having a top portion and a shoulder portion, the shoulder portion being adapted to receive and support a flexible circuit thereon.

According to preferred aspects of this embodiment of the invention, the shoulder portion is located substantially above the second surface of the connector body. The connector body is preferably fabricated from a high-temperature thermoplastic and can include a plurality of ribs adapted to support the flexible circuit. The in-line connector can include any number of pins and in one embodiment includes 24 of the contact pins.

According to another embodiment of the present invention, an assembled connector adapted for use in a disk drive apparatus is provided. The assembled connector includes an insulative connector body having a first surface and a second surface and a plurality of contact pins extending from the second surface, the pins having a shoulder portion adapted to receive and support a flexible circuit thereon and a top portion extending from the shoulder portion. A flexible circuit is mounted on the contact pins and is supported by the shoulder portions wherein the top portions of the pins extend through apertures in the flexible circuit. A solder joint connects the flexible circuit and the contact pins.

According to yet another embodiment of the present invention, a method for attaching a flexible circuit to an in-line connector for use in a disk drive apparatus is provided. The method preferably includes the steps of providing an in-line connector having a surface and having a plurality of contact pins extending from the surface, the contact pins being adapted to receive a flexible circuit and placing a flexible circuit having a first thickness over the contact pins such that portions of the pins extend through apertures in the flexible circuit. The contact pins are then soldered to the flexible circuit using a screen having a second thickness, wherein the pins extend above the flexible circuit but do not extend above the screen. The contact pins can preferably include a shoulder portion and a top portion extending from the shoulder portion, wherein the height of the top portion is greater than the first thickness and less than the sum of the first thickness and the second thickness. This method advantageously permits a high-volume solder screening process to be used such that the pins are not damaged by the screening step.

DETAILED DESCRIPTION

Figure 1:
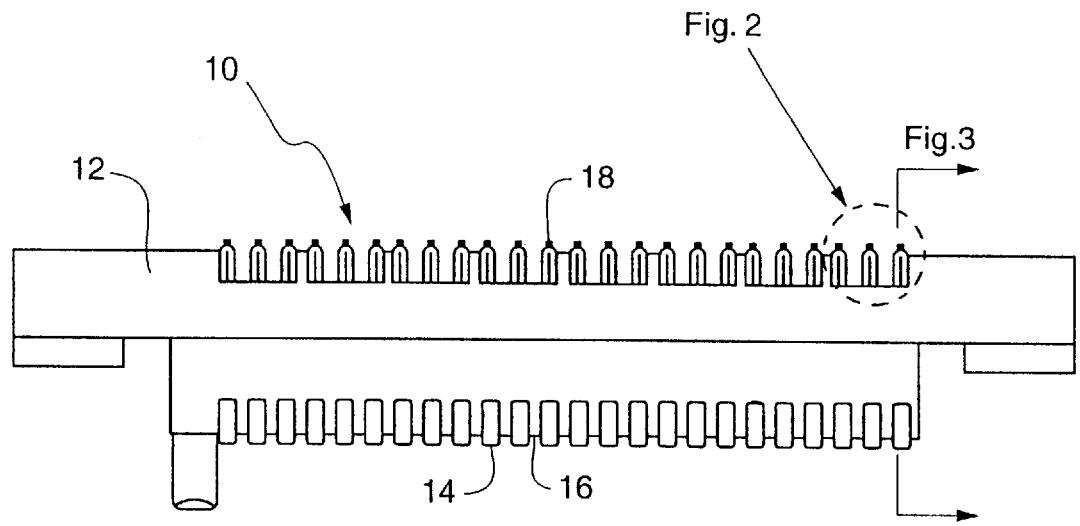
FIG. 1 illustrates an in-line connector according to an embodiment of the present invention.

An in-line connector according to an embodiment of the present invention is illustrated in FIG. 1. Connectors such as those illustrated in FIG. 1 are particularly useful in devices such as computer disk drives where an electrical interface is desired between two substrates, such as a printed circuit board and a flexible circuit board. The connector body 12 of the in-line connector 10 is fabricated from an electrically insulative material and in a preferred embodiment is fabricated from a high-temperature thermoplastic material, for example RYTON (Phillips Chemical Company, Plastics Division). The electrical contacts 14 projecting from the lower surface 16 of the connector are adapted to interface with a printed circuit board and can be designed in any manner known in the art. The contacts 14 are made from a highly conductive metal, such as copper alloys or stainless steel.

As is illustrated in FIG. 1, the in-line connector 10 includes a substantially linear row of contact pins 18 which are adapted to engage corresponding row of terminal pads on a flexible circuit. The contact pins 18 are electrically connected through the connector body 12 to corresponding electrical contacts 14 on the lower surface 16 of the connector body 12. For example, a contact pin 18 and a corresponding electrical contact 14 can be fabricated from a single metallic piece that is molded into the connector body 12.

Figure 2:
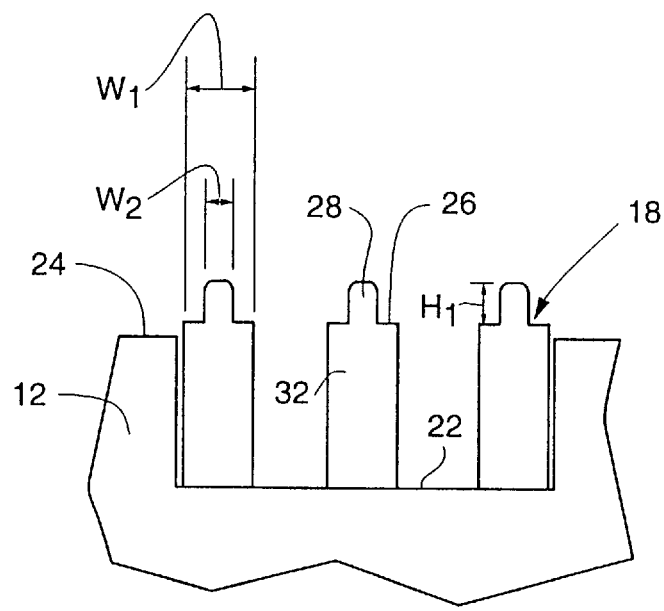
FIG. 2 illustrates a surface portion of an in-line connector according to an embodiment of the present invention.

FIG. 2 illustrates a surface portion of an in-line connector, such as that illustrated in FIG. 1. A plurality of contact pins 18 are spaced at a predetermined pitch along the top surface 22 of the connector body 12. The pins 18 protrude slightly above ribs 24 that are located on the top surface 22 of the connector for support. The ribs 24 can provide support for the flexible circuit that is placed on the connector. The ribs 24 also provide channels between the flexible circuit and the connector body which are useful for permitting cleaning of the device after assembly using liquids.

The contact pins 18 advantageously include a shoulder portion 26 which is adapted to receive and support a flexible circuit thereon, as is discussed in more detail below. The shoulder portion 26 defines a top portion 28 and bottom portion 32 of the pin 18. The shoulder portion 26 can advantageously be situated above the top surface 22 of the connector body 12, including any ribs 24, such that the flexible circuit is supported by the shoulder portion 26 of the pins. The shoulder portion 26 can also be substantially flush with the rib 24 such that both the shoulder portion 26 and the rib 24 support the flexible circuit. As with the electrical contacts discussed above, the contact pins 18 are fabricated from a highly conductive metal, such as a copper alloy or stainless steel.

Figure 3:
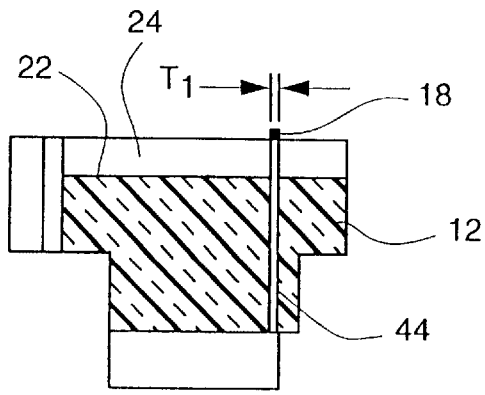
FIG. 3 illustrates a cross-section of an in-line connector according to an embodiment of the present invention.

FIG. 3 illustrates a cross-section of an in-line connector according to the present invention. A conductive path 44 is sealed within the insulative connector body 12 and is connected at the opposite end to a contact pin 18. The contact pin 18 extends above the top surface 22, including the rib 24 of the connector body. The contact pin 18 is adapted to receive a flexible circuit placed on the top of the connector.

Figure 4:
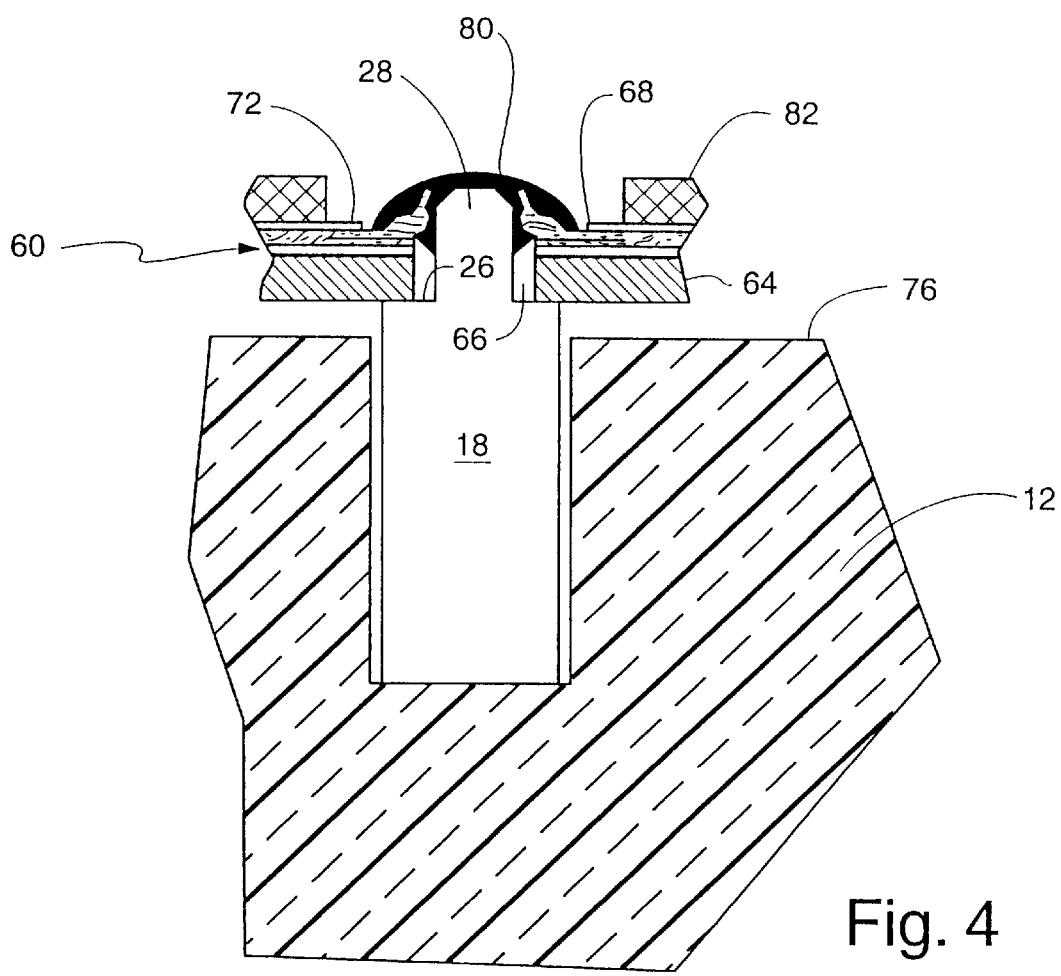
FIG. 4 illustrates a cross-section of a surface portion of an in-line connector having a flexible circuit attached thereto according to an embodiment of the present invention.

FIG. 4 illustrates a cross-section of an assembly according to the present invention wherein a flexible circuit 60 is attached to the contact pin 18. In the embodiment illustrated in FIG. 4, the connector body 12 substantially surrounds the contact pin 18. The flexible circuit 60 includes an insulative flexible substrate layer 64 upon which conductive films are applied to provide conductive traces. The flexible circuit 60 also includes apertures 66 which are adjacent to conductive terminal pads 68 on the top surface of the flexible circuit 60. When the flexible circuit 60 is properly placed on the connector, the top portion 28 of the pin extends through the flexible circuit 60 and preferably protrudes above the top surface 72 of the flexible circuit. The shoulder portion 26 of the contact pin preferably extends above the top surface 76 of the connector body 12 to support the flexible circuit 60.

According to the present invention, the solder joint 80 is formed by applying solder to the flexible circuit using a squeegee to force solder through a screen 82 in the areas above the contact pins/terminal pads. The solder joint 80 electrically connects the top portion 28 of the contact pin to the terminal pad 68 of the flexible circuit. The solder joint 80 provides both an electrical and a mechanical attachment to the contact pin 18, and hence to the connector.

In a screening process such as that preferred according to the present invention for applying solder to the flex circuit, a permeable screen is used that permits solder paste to pass through in preselected locations when a squeegee or roller is run over the top surface of the screen. The squeegee thus forces the solder paste through selected areas of the screen and onto the contact pin/terminal pad locations. Individual patterns for different circuit configurations can easily be formed in separate screens by techniques such as laser cutting or chemical etching.

For purposes of understanding the present invention, FIG. 4 illustrates a screen 82 in contact with the flex circuit, such as would be the case during application of the solder to the flexible circuit 60. As is illustrated in FIG. 4, the contact pin 18 extends above the top surface 72 of the flexible circuit, but does not substantially extend above the top surface of the screen 82. Thus, when the squeegee is pressed against the screen 82 to force solder paste through the screen 82 and deposit solder for the solder joint 80, the top portion 28 of the contact pin does not damage the squeegee, nor does the squeegee damage or stress the contact pin 18. The height of the top portion 70 of the contact pin (i.e. the distance from the shoulder portion 74 to the very top of the pin) can advantageously be selected to accommodate different thicknesses of flexible circuit and screen. The desired feature according to the present invention is that the height of the top portion of the pin does not exceed the combined thickness of the flexible circuit and the screen used to apply the solder. Preferably, the top portion of the pin does exceed the thickness of the flexible circuit.

More specifically, the screen will typically have a thickness of from about 5.5 to about 6.5 mils (1 mil=$\frac{1}{1000}$ of an inch) and a flexible circuit will typically have a thickness of from about 8.1 to about 12.1 mils. The total thickness of the flex circuit and screen is preferably 14 to 18 mils. Therefore, it is preferred that the height ($H_1$ in FIG. 3) of the top portion of the contact pin be from about 11 to about 14 mils to ensure that the top portion of the pin does not extend above the top surface of the screen when the screen is placed on the flex circuit during the soldering process.

The contact pins according to the present invention are preferably rectangular in cross-section having a thickness ($T_1$ in FIG. 3) of about 8 mils. The width of the bottom portion and shoulder portion of the pins ($W_1$ in FIG. 2) is from about 22 to about 26 mils and the width of the top portion ($W_2$ in FIG. 2) is from about 9 to about 13 mils.

The method of the present invention includes the steps of providing a connector apparatus, such as that described above, having a plurality of contact pins extending from a connector body. Each of the pins can advantageously include a shoulder portion adapted to receive and support a flexible circuit. The flexible circuit includes a plurality of apertures adjacent to terminal pads wherein the apertures are adapted to receive the top portion of the contact pins therethrough. The flexible circuit is placed over the contact pins such that the shoulder of the contact pins supports the circuit. That is, the apertures in the flexible circuit are large enough to permit the top portion of the contact pin to pass through but are small enough such that the shoulder portion cannot pass through.

After the flexible circuit is properly placed over the connector, a screen is placed over the flexible circuit. The screen includes a mask such that when solder paste is squeezed across the surface of the screen, the solder paste passes through the screen in the locations over the contact pins/terminal pads electrically and mechanically connect them. Since the contact pins do not extend above the top surface of the screen, the squeegee is not substantially damaged by the pins during this process and the pins are likewise not damaged by the squeegee. After application of the solder paste, the device can be heated to drive solvents from the solder paste and form a rigid solder joint.

The method of the present invention advantageously permits a flexible circuit to be attached to a connector in an economical manner since all of the connections can be made with one simple process step. Previous devices required individual soldering of the terminal pad/contact pin areas. The shoulder portions support the flexible circuit, particularly during the soldering process which applies downward pressure on the flexible circuit.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. An in-line connector adapted for use in a disk drive apparatus for interconnecting a printed circuit board and a flexible circuit, comprising:

an insulative connector body having a first surface and a second surface;

a plurality of electrical contacts on said first surface;

a plurality of ribs extending from said second surface, said ribs providing a plurality of channels between said connector body and the flexible circuit; and a plurality of contact pins extending from said second surface and being electrically interconnected with said electrical contacts through said connector body, said pins, each comprising a top portion and a shoulder portion, said ribs being spaced among said contact pins and said shoulder portion of said contact pin positioned above a top of said ribs, wherein said shoulder portion is adapted to receive and support a flexible circuit thereon and said top portion is adapted to extend through said flexible circuit.

2. An in-line connector as recited in claim 1, wherein said shoulder portion is located substantially above said second surface of said connector body.

3. An in-line connector as recited in claim 1, wherein said connector body is fabricated from a high-temperature thermoplastic.

4. An in-line connector as recited in claim 1, wherein said connector comprises 24 of said contact pins.

5. An in-line connector as recited in claim 1, wherein said contact pins are substantially rectangular in cross-section.

6. An in-line connector as recited in claim 5, wherein said shoulder portions of said contact pins have a width of from about 22 mils to about 26 mils.

7. An in-line connector as recited in claim 6, wherein said top portion has a width of from about 9 mils to about 13 mils.

8. An in-line connector as recited in claim 7, wherein said contact pin has a thickness of about 8 mils.

9. An in-line connector as recited in claim 1, wherein said top portion has a height of about 11 to 14 mils.

10. An assembled connector adapted for use in a disk drive apparatus, comprising:

an insulative connector body having a first surface and a second surface;

a plurality of ribs extending from said second surface, said ribs providing a plurality of channels between said connector body and the flexible circuit;

a plurality of contact pins extending from said second surface, said pins, each comprising a shoulder portion adapted to receive and support a flexible circuit thereon and a top portion extending from said shoulder portion, said ribs being spaced among said contact pins and said shoulder portion of said contact pin positioned above a top of said ribs;

a flexible circuit mounted on said shoulders of said contact pins and supported by said shoulder portions wherein said top portions of said pins extend through apertures in said flexible circuit; and a solder joint connecting said flexible circuit and said contact pins.

11. An in-line connector adapted for use in a disk drive apparatus for interconnecting a printed circuit board and a flexible circuit, comprising:

an insulative connector body having a first surface and a second surface;

a plurality of electrical contacts on said first surface;

a plurality of ribs extending from said second surface, said ribs providing a plurality of channels between said connector body and the flexible circuit; and a plurality of contact pins extending from said second surface and being electrically interconnected with said electrical contacts through said connector body, said pins, each comprising a top portion and a shoulder portion, said top portion having a height capable of providing electrical connection to only a single flex circuit interposed over said top portion, said ribs being spaced among said contact pins and said shoulder portion of said contact pin positioned above a top of said ribs;

and said shoulder portion being adapted to receive and support a flexible circuit thereon and said top portion is adapted to extend through said flexible circuit.

12. An in-line connector as recited in claim 11, further comprising:

a permeable solder screen positioned over said flexible circuit to allow solder paste to be applied to said connector pins, said solder screen having a first thickness, said flexible circuit having a second thickness, wherein said height of said top portion is greater than said second thickness but less than said first thickness plus said second thickness.

* * * * *